United States Patent
Kuo et al.

(10) Patent No.: US 8,848,144 B2
(45) Date of Patent: Sep. 30, 2014

(54) PIXEL STRUCTURE AND DISPLAY PANEL

(75) Inventors: Ya-Pei Kuo, Taipei County (TW); Min-Ta Lai, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 892 days.

(21) Appl. No.: 13/031,248

(22) Filed: Feb. 21, 2011

(65) Prior Publication Data
US 2012/0140156 A1    Jun. 7, 2012

(30) Foreign Application Priority Data
Dec. 1, 2010   (TW) ................................ 99223329 U

(51) Int. Cl.
G02F 1/1335   (2006.01)
G02F 1/1362   (2006.01)

(52) U.S. Cl.
CPC .... *G02F 1/133553* (2013.01); *G02F 1/136227* (2013.01)
USPC .......................................................... 349/114

(58) Field of Classification Search
USPC .......................................................... 349/114
See application file for complete search history.

(56) References Cited

U.S. PATENT DOCUMENTS

2005/0270454 A1 * 12/2005 Ahn et al. ...................... 349/114
2006/0121745 A1 *  6/2006 Fujii .............................. 438/790
2008/0105875 A1 *  5/2008 Maekawa et al. ............... 257/72

* cited by examiner

*Primary Examiner* — Eric Wong
(74) *Attorney, Agent, or Firm* — Jianq Chyun IP Office

(57) ABSTRACT

A pixel structure and a display panel are provided. The pixel structure is configured on a substrate that has at least one first display region and at least one second display region adjacent thereto. The pixel structure includes an active device, a protection layer, a reflective pattern, and a pixel electrode. The active device is configured on the substrate and located in the first display region. The protection layer is configured on the substrate, covers the active device, and is located in both the first and second display regions. The reflective pattern is configured on the protection layer, located in the first display region, and exposes a portion of the protection layer located in the second display region. The reflective pattern is doped with a fluorescence material. The pixel electrode is configured on the reflective pattern and the portion of the protection layer exposed by the reflective pattern.

12 Claims, 5 Drawing Sheets

PIXEL STRUCTURE AND DISPLAY PANEL

CROSS-REFERENCE TO RELATED APPLICATION

This application claims the priority benefit of Taiwan application serial no. 99223329, filed on Dec. 1, 2010. The entirety of the above-mentioned patent application is hereby incorporated by reference herein and made a part of this specification.

BACKGROUND OF THE INVENTION

1. Field of Invention

The invention relates to a pixel structure and a display panel. More particularly, the invention relates to a transflective pixel structure and a display panel having the transflective pixel structures.

2. Description of Related Art

In general, a transflective liquid crystal display (LCD) panel includes an active device array substrate, a color filter substrate, and a liquid crystal layer sandwiched by the two substrates. The transflective LCD panel can perform the display function by simultaneously applying a backlight module and an external light source. Therefore, favorable display effects can be accomplished by the transflective LCD panel when the light sources having different intensity are applied. In the transflective LCD panel, each pixel structure of the active device array substrate can be divided into a transmissive region and a reflective region that respectively display images in a transmissive mode and a reflective mode.

Generally, when the transflective LCD panel with good reflectivity is intended to be formed, a plurality of bumps are formed in the reflective region. The bumps can also be used in a reflective LCD panel. When the bumps are formed by performing a conventional manufacturing process, two photo masks are often employed. After a baking process is performed, each bump can have even and smooth top surface.

Since two photo masks are employed and two exposure steps are performed to form the bumps, the time of fabricating the entire panel is extended. Besides, in the conventional design of the pixel structure, the bumps are irregularly arranged in the reflective region, and thus the reflectivity of the pixel structure cannot be improved significantly. Moreover, the display brightness of the conventional pixel structure is relatively high at a certain viewing angle but is comparatively low at other viewing angles. That is to say, the brightness of images which are displayed in the reflective mode is significantly changed together with the variations in the viewing angles. Consequently, the display effects accomplished by the conventional pixel structure having the irregularly arranged bumps and by the display panel having the conventional pixel structures still need to be improved.

SUMMARY OF THE INVENTION

An embodiment of the invention is directed to a pixel structure. When the pixel structure displays images in a reflective mode, the display brightness is not apt to be significantly changed together with the variations in the viewing angles.

An embodiment of the invention is further directed to a display panel that can achieve favorable display effects in the reflective mode.

In an embodiment of the invention, a pixel structure is configured on a substrate that has at least one first display region and at least one second display region adjacent thereto. The pixel structure includes an active device, a protection layer, a reflective pattern, and a pixel electrode. The active device is configured on the substrate and located in the first display region. The protection layer is configured on the substrate and covers the active device. Besides, the protection layer is located in both the first and second display regions. The reflective pattern is configured on the protection layer, located in the first display region, and exposes a portion of the protection layer located in the second display region. The reflective pattern is doped with a fluorescence material. The pixel electrode is configured on the reflective pattern and the portion of the protection layer exposed by the reflective pattern.

In an embodiment of the invention, a display panel includes a plurality of the aforesaid pixel structures, an opposite substrate, and a display medium layer. The pixel structures are configured on the substrate. The opposite substrate is opposite to the substrate. The display medium layer is configured between the substrate and the opposite substrate, and each of the pixel structures is located between the substrate and the display medium layer.

According to an embodiment of the invention, a material of the reflective pattern is a light curing material.

According to an embodiment of the invention, a material of the reflective pattern includes metal oxide.

According to an embodiment of the invention, a material of the reflective pattern includes titanium oxide, magnesium oxide, magnesium sulfate, calcium oxide, or a combination thereof.

According to an embodiment of the invention, an excited light emitted by the fluorescence material has a wavelength ranging from about 380 nm to about 470 nm.

According to an embodiment of the invention, the reflective pattern has a substantially planar upper surface, and the pixel electrode is configured on the upper surface.

According to an embodiment of the invention, the active device includes a gate, a gate insulating layer, a channel layer, a source, and a drain. The gate is configured on the substrate. The gate insulating layer is configured on the substrate and covers the gate. The channel layer is configured on the gate insulating layer and located above the gate. The source and the drain are configured on the channel layer and opposite to each other. Besides, the protection layer can have a first opening that exposes the drain of the active device. The pixel electrode is electrically connected to the drain through the first opening. Alternatively, the reflective pattern can have a second opening corresponding to the first opening. The first opening and the second opening expose the drain of the active device, and the pixel electrode is electrically connected to the drain through the first opening and the second opening. To be more specific, the second opening partially exposes the protection layer that is located in the first display region.

According to an embodiment of the invention, a material of the display medium layer is a liquid crystal material, for instance.

Based on the above, the reflective pattern characterized by light curing properties is configured in the pixel structure and serves as a reflective device according to the embodiments of the invention. Hence, the pixel structure can perform the display function in a transflective manner. On the other hand, the reflective pattern can substantially accomplish the diffusive reflection, and therefore the pixel structure and the display panel described in the embodiments of the invention in the reflective display mode are not apt to have the inconsistent display quality when the viewing angles are changed.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
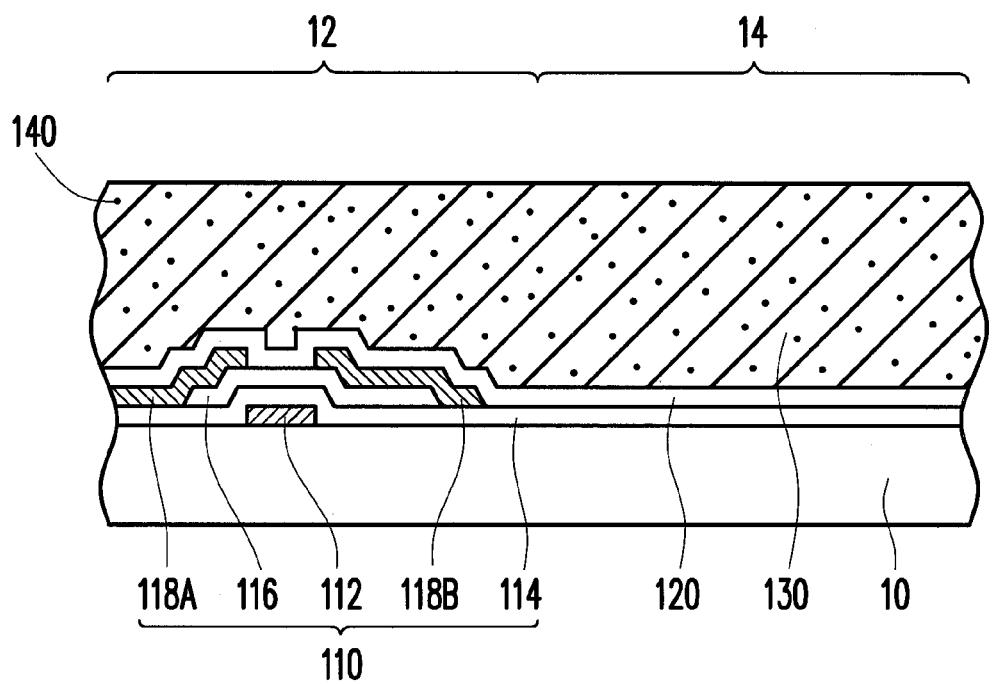
FIG. 1A to FIG. 1D illustrate a method of fabricating a pixel structure according to a first embodiment of the invention.

FIG. 1A to FIG. 1D illustrate a method of fabricating a pixel structure according to a first embodiment of the invention. With reference to FIG. 1A, an active device 110, a protection layer 120, and a reflective material layer 130 are sequentially formed on a substrate 10. The substrate 10 has at least one first display region 12 and at least one second display region 14 adjacent to the first display region 12, for instance. The active device 110 is configured in the first display region 12 according to this embodiment. The protection layer 120 covers the active device 110, and the reflective material layer 130 covers the protection layer 120. In this embodiment, the first display region 12 and the second display region 14 are a reflective display region and a transmissive display region, respectively.

In particular, the active device 110 includes a gate 112, a gate insulating layer 114, a channel layer 116, a source 118A, and a drain 118B. The gate 112 is configured on the substrate 10. The gate insulating layer 114 is configured on the substrate 10 and covers the gate 112. The channel layer 116 is configured on the gate insulating layer 114 and located above the gate 112. The source 118A and the drain 118B are configured on the channel layer 116 and opposite to each other. Note that the active device 110 depicted in FIG. 1A is exemplary and is not intended to limit the invention. In other embodiments of the invention, the active device 110 can be a low temperature polysilicon thin film transistor (LTPS-TFT), a top-gate TFT, a dual-gate TFT, or any other element that can act as a switch device.

The reflective material layer 130 of this embodiment is made of a light curing material, for instance, and therefore a specific pattern can be formed by the reflective material layer 130 after a photolithography process is performed. According to an embodiment of the invention, the material of the reflective material layer 130 includes metal oxide (e.g., titanium oxide, calcium oxide, magnesium oxide, and so on) or metal salt (e.g., magnesium sulfate). In addition, the reflective material layer 130 is doped with a fluorescence material 140.

Figure 1B:
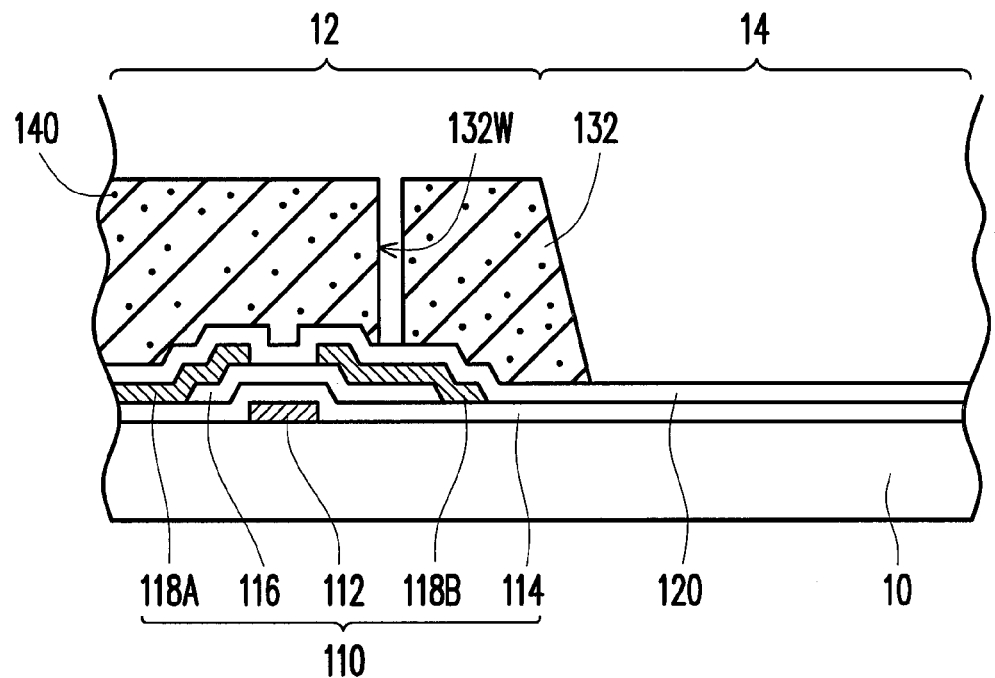

With reference to FIG. 1A and FIG. 1B, a photolithography process is performed to pattern the reflective material layer 130, so as to form a reflective pattern 132 that has an opening 132W. The reflective material layer 130 is characterized by the light curing properties. Therefore, the reflective pattern 132 can be formed by directly using a photo mask as a mask, and an ultraviolet light or a light capable of curing the reflective material layer 130 passes through the photo mask and irradiates a portion of the reflective material layer 130. For instance, the reflective material layer 130 located in the first display region 12 is irradiated. The portion of the reflective material layer 130 that is not cured can then be removed, so as to form the reflective pattern 132 that is configured in the first display region 12. In an alternate embodiment, when the reflective pattern 132 is formed according to other embodiments of the invention, a patterned photoresist layer (not shown) can be formed on the reflective material layer 130 depicted in FIG. 1A, and the patterned photoresist layer (not shown) can serve as the mask for curing the reflective material layer 130. Since the reflective material layer 130 is characterized by the light curing properties, the reflective material layer 130 can be directly patterned by performing the photolithography process in no need of implementing other complicated manufacturing steps.

As shown in FIG. 1B, it should be mentioned that the reflective pattern 132 is configured in the first display region 12 and exposes a portion of the protection layer 120 that is located in the second display region 14. Hence, the first display region 12 is a reflective display region, and the second display region 14 is a transmissive display region, for example. The opening 132W of the reflective pattern 132 exposes a portion of the protection layer 120 that is located above the drain 118B.

Figure 1C:
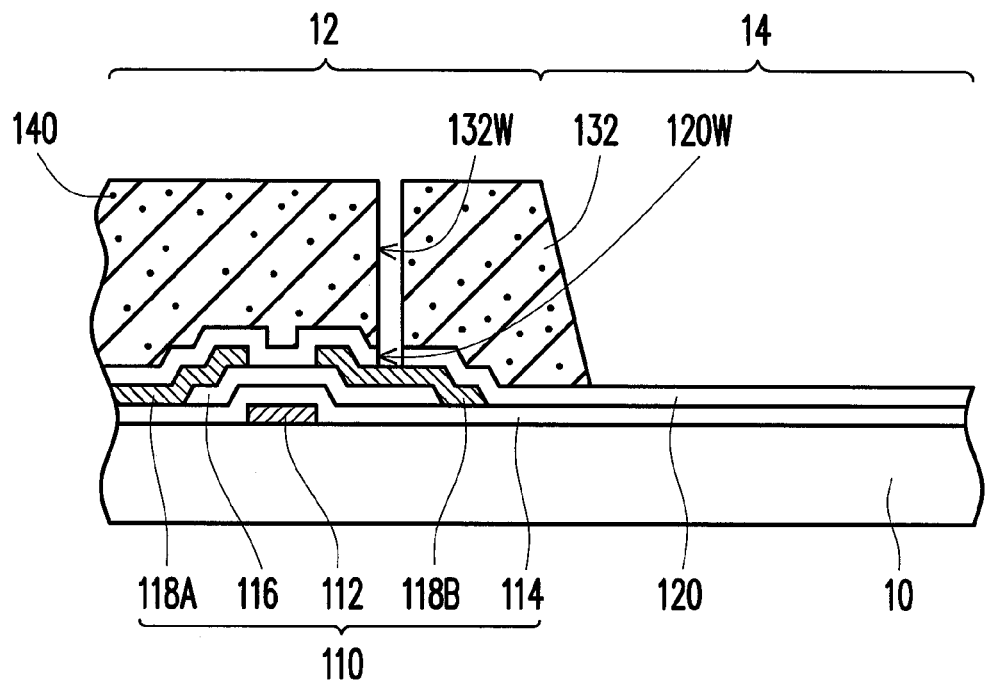

With reference to FIG. 1C, another photolithography process is performed to form another opening 120W in the protection layer 120. In this step, the opening 120W can be formed by removing a portion of the protection layer 120 located above the drain 118B by using another patterned photoresist layer (not shown) as a mask. Here, the portion of the protection layer 120 exposed by the opening 132W as shown in FIG. 1B is removed. Namely, after the step shown in FIG. 1C is completely performed, the opening 132W and the opening 120W correspond to each other, and the openings 132W and 120W together expose the drain 118B of the active device 110.

Figure 1D:
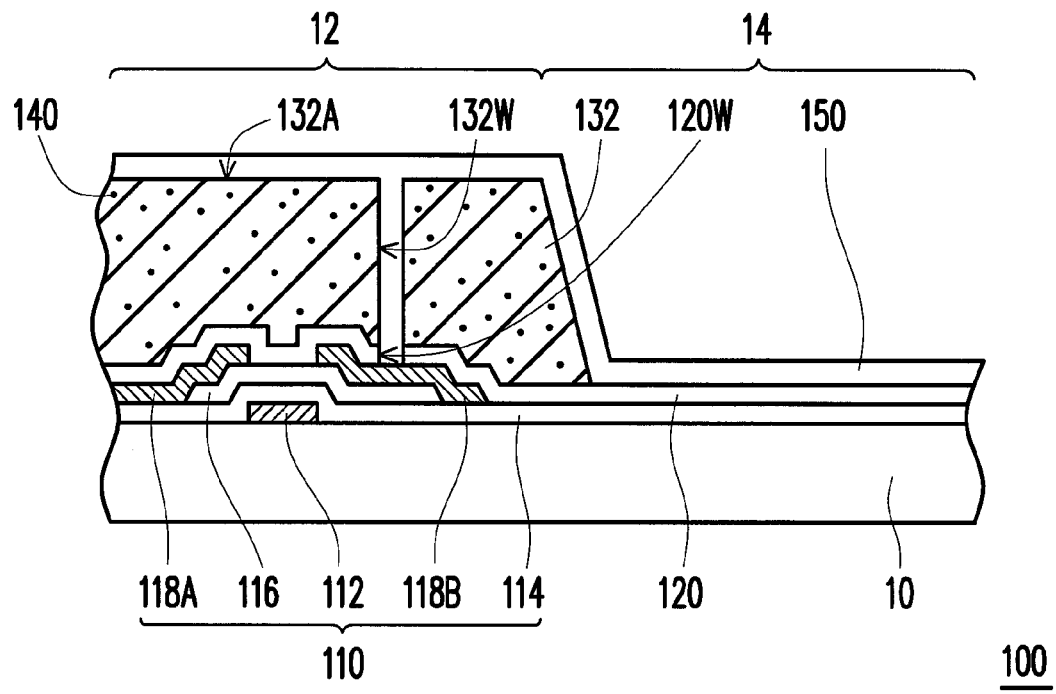

With reference to FIG. 1D, a pixel electrode 150 is formed on the substrate 10, and the pixel structure 100 is completely formed. The pixel electrode 150 is made of a transparent conductive material, for instance. Besides, the pixel electrode 150 is electrically connected to the drain 118B of the active device 110 through the opening 120W of the protection layer 120 and the opening 132W of the reflective pattern 132. When the pixel structure 100 displays images, the first display region 12 performs the display function in a reflective manner, and the second display region 14 performs the display function in a transmissive manner, for instance.

Note that the pixel structure 100 includes the active device 110, the protection layer 120, the reflective pattern 132, and the pixel electrode 150. The active device 110 is configured on the substrate 10 and located in the first display region 12. The protection layer 120 is configured on the substrate 10 and covers the active device 110. Besides, the protection layer 120 is located in both the first and second display regions 12 and 14. The reflective pattern 132 is configured on the protection layer 120, located in the first display region 12, and exposes a portion of the protection layer 120 located in the second display region 14. The reflective pattern 132 is doped with a fluorescence material 140. The pixel electrode 150 is configured on the reflective pattern 132 and the portion of the protection layer 120 exposed by the reflective pattern 132.

The reflective pattern 132 is a white reflective element that is made of metal oxide or metal salt, and the reflective pattern 132 can accomplish diffusion reflection. After light irradiates the reflective pattern 132, the light is reflected in various directions. Accordingly, in this embodiment, the light can be reflected at various angles even though no bumps are formed on the reflective pattern 132. As such, the conventional step of forming the bumps in the transflective pixel structure can be omitted, which is conducive to simplification of the manufacturing process and improvement of manufacturing efficiency of the pixel structure 100. In other words, the reflective pattern 132 of this embodiment has a substantially planar upper surface 132A on which the pixel electrode 150 is configured.

Moreover, the reflective pattern 132 is doped with the fluorescence material 140, and thus the color performance of the displayed images of the pixel structure 100 can be adjusted. For instance, given that the reflective pattern 132 has favorable reflectivity when the light passing the reflective pattern 132 has a long wavelength, the images displayed in the reflective mode and generated by the light that is reflected by the reflective pattern 132 often appear to be yellowish or reddish. Hence, the reflective pattern 132 is doped with the fluorescence material 140 that emits the excited light having a relatively short wavelength within the range of a visible light according to this embodiment, so as to compensate the color of the images which are displayed in a reflective mode. For instance, the fluorescence material 140 can be blue fluorescence powder, e.g., Alexa Fluor 350, AMCA-X, cascade blue, dialkylaminocoumarin, hydroxycoumarin, marina blue, methoxycoumarin, pacific blue, and so on. Besides, a wavelength of the excited light emitted by the fluorescence material 140 ranges from about 380 nm to about 470 nm, for instance. In an embodiment of the invention, when the excited light has the wavelength ranging from about 440 nm to about 450 nm, the excited light appears to be purely blue, which is conducive to improvement of the yellowish or reddish images. Namely, the display images can have good color performance.

The concentration of the fluorescence material 140 in the reflective pattern 132 can be adjusted in accordance with the actual product design. For instance, the concentration of the fluorescence material 140 in the reflective pattern 132 can be determined by a chromatic equation. Certainly, the concentration of the fluorescence material 140 in the reflective pattern 132 is subject to light source properties, color temperature required by the display images, and so forth.

In general, no additional process of fabricating the bumps in the first display region 12 (i.e., the reflective display region) of the pixel structure 100 is required according to this embodiment. Additionally, since the reflective pattern 132 is characterized by the light curing properties, the required reflective pattern 132 can be formed by directly performing the photolithography process. Hence, the pixel structure 100 of this embodiment can be formed by performing the simple manufacturing process. Particularly, the reflective pattern 132 is doped with the fluorescence material 140, and thus the pixel structure 100 can have good display quality. What is more, the images displayed in the reflective mode are not apt to be yellowish or reddish.

Figure 2A:
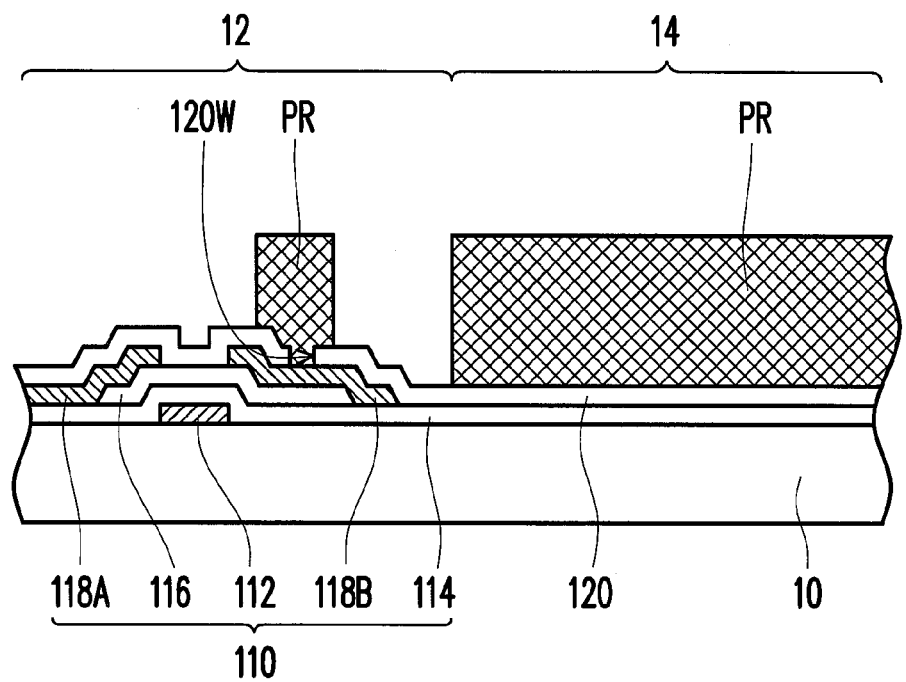
FIG. 2A to FIG. 2D illustrate a method of fabricating a pixel structure according to a second embodiment of the invention.

FIG. 2A to FIG. 2D illustrate a method of fabricating a pixel structure according to a second embodiment of the invention. With reference to FIG. 2A, an active device 110, a protection layer 120, and a patterned photoresist layer PR are sequentially formed on a substrate 10. In this embodiment, the substrate 10 is divided into at least one first display region 12 and at least one second display region 14. The active device 110 is located in the first display region 12, for instance. The active device 110 includes a gate 112, a gate insulating layer 114, a channel layer 116, a source 118A, and a drain 118B. According to this embodiment, the structural design of the active device 110 can be referred to as that described in the first embodiment, and therefore no further description is given herein. Certainly, the active device 110 depicted in FIG. 2A is exemplary and is not intended to limit the invention. Besides, the protection layer 120 depicted in FIG. 2A has an opening 120W that exposes the drain 118B of the active device 110.

It should be mentioned that a portion of the patterned photoresist layer PR is configured in the second display region 14, while the other portion of the patterned photoresist layer PR is configured on and covers the opening 120W of the protection layer 120, for instance. Specifically, the patterned photoresist layer PR does not expose the opening 120W and the region surrounding the opening 120W but exposes the rest of the first display region 12.

Figure 2B:
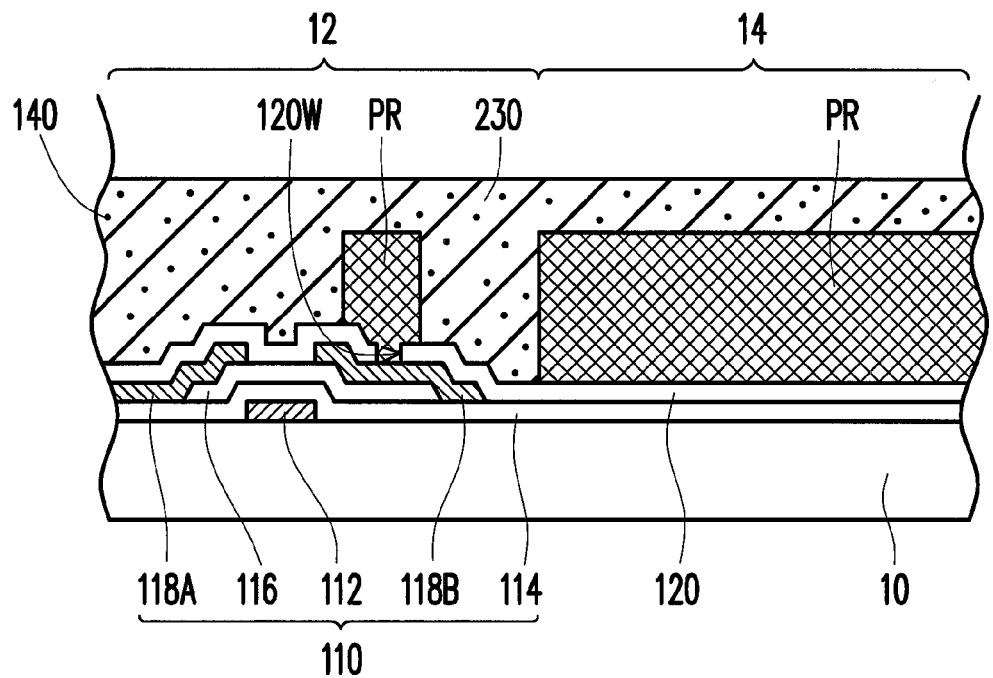

As shown in FIG. 2B, a reflective material layer 230 is formed on the substrate 10. Here, the reflective material layer 230 is doped with the fluorescence material 140 and is characterized by the light curing properties. To be more specific, the reflective material layer 230 can be made of the material described in the first embodiment, i.e., metal oxide, metal salt, or the like. In this step, the reflective material layer 230 is not cured yet, and the thickness of the reflective material layer 230 can be greater than the thickness of the patterned photoresist layer PR.

Figure 2C:
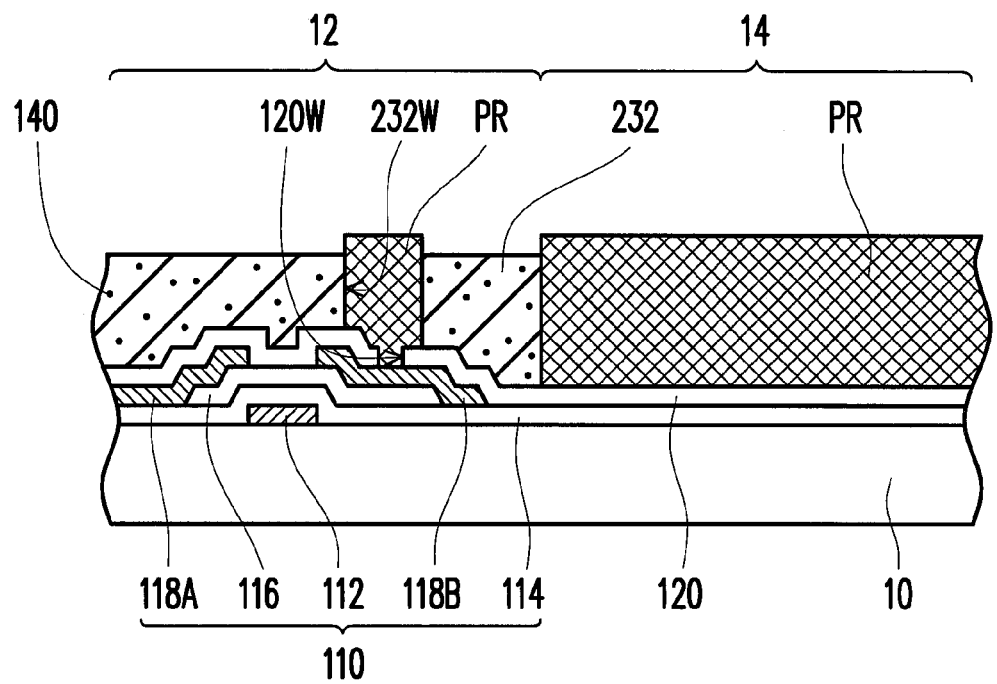

As indicated in FIG. 2B and FIG. 2C, the reflective material layer 230 is cured, so as to form the reflective pattern 232 in the first display region 12 exposed by the patterned photoresist layer PR. The reflective material layer 230 is characterized by the light curing properties. Therefore, in this embodiment, the ultraviolet light or any other light capable of curing the reflective material is applied to irradiate the reflective material layer 230, so as to cure the reflective material layer 230 to form the reflective pattern 232. Besides, the volume of the cured reflective material layer 230 is smaller than the volume of the reflective material layer 230 before the reflective material layer 230 is cured. Hence, after the curing process is performed, the reflective pattern 232 is shrunk and merely located in the first display region 12 but not in the second display region 14. That is to say, due to the fact that the volume of the reflective material layer 230 is reduced after the reflective material layer 230 is cured, when there is a patterned photoresist layer PR configured in the pixel structure, the reflective material layer 230 is spontaneously shrunk and patterned to form the reflective pattern 232. Here, the reflective pattern 232 can have an opening 232W, for instance.

Figure 2D:
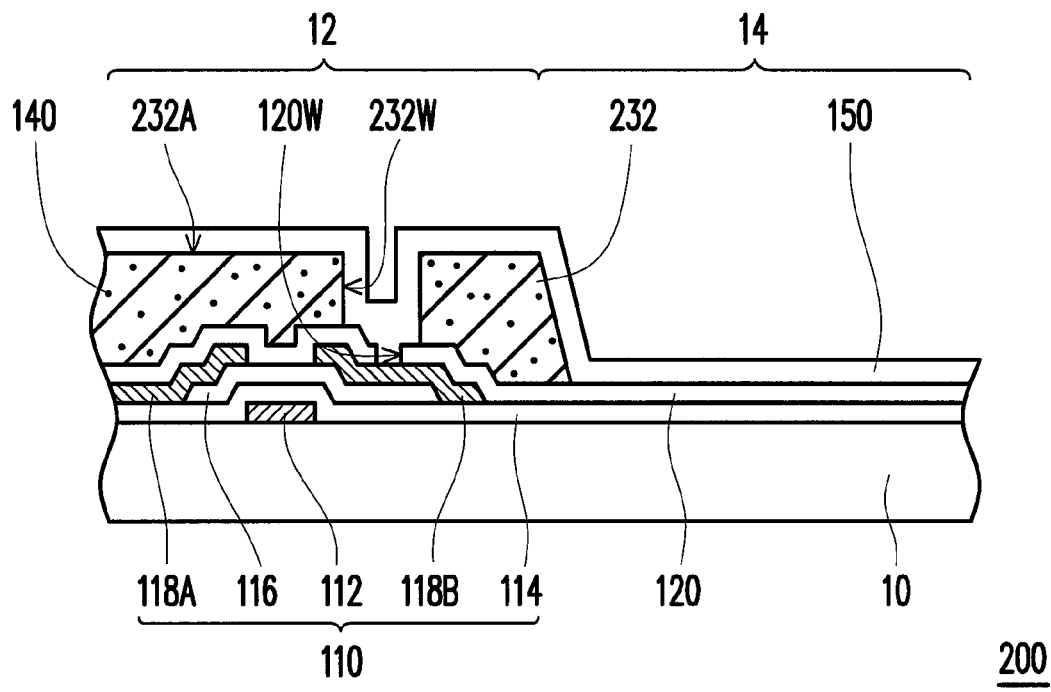

After the reflective pattern 232 is completely formed, the patterned photoresist layer PR can be removed. With reference to FIG. 2D, a pixel electrode 150 is formed on the substrate 10 to form the pixel structure 200. The pixel structure 200 includes the active device 110, the protection layer 120, the reflective pattern 232, and the pixel electrode 150. The active device 110 is configured on the substrate 10 and located in the first display region 12. The protection layer 120 is configured on the substrate 10 and covers the active device 110. In addition, the protection layer 120 is located in both the first and second display regions 12 and 14. The reflective pattern 232 is configured on the protection layer 120, located in the first display region 12, and exposes a portion of the protection layer 120 located in the second display region 14. The reflective pattern 232 is doped with a fluorescence material 140. The pixel electrode 150 is configured on the reflective pattern 232 and the portion of the protection layer 120 exposed by the reflective pattern 232.

Besides, in this embodiment, the aperture of the opening 232W of the reflective pattern 232 is greater than the aperture of the opening 120W of the protection layer 120, for example. Hence, the opening 232W partially exposes the protection layer 120 located above the drain 118B. The pixel electrode 150 is electrically connected to the drain 118B through the openings 232W and 120W.

In this embodiment, the fluorescence material 140 doped into the reflective pattern 232 is conducive to the adjustment of the color of the images which are displayed in a reflective mode. Hence, the pixel structure 200 can have favorable display quality. Additionally, the reflective pattern 232 can accomplish the diffusive reflection, and thus no additional process of fabricating protrusions on the surface of the reflective pattern 232 is required in this embodiment for reducing the difference in brightness of the images which are displayed in a reflective mode at different viewing angles. As such, when the pixel structure 200 is formed, it is not necessary to additionally form the bumps, and thus the manufacturing method of the pixel structure 200 can be simplified. Consequently, the reflective pattern 232 has a substantially planar upper surface 232A, and the pixel electrode 150 is directly configured on the planar upper surface 232A.

Figure 3:
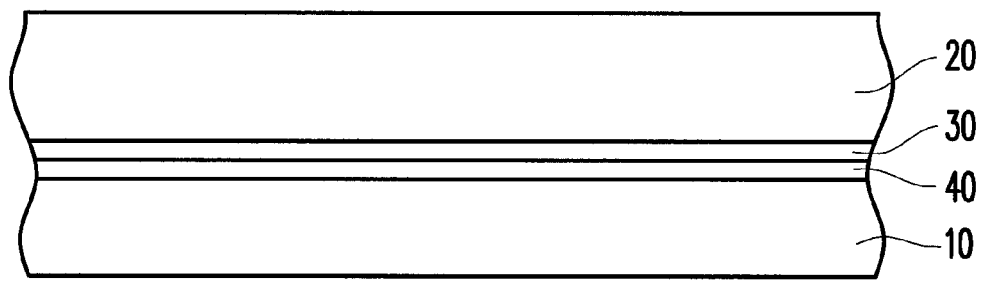
FIG. 3 illustrates a display panel according to an embodiment of the invention.

FIG. 3 illustrates a display panel according to an embodiment of the invention. With reference to FIG. 3, the display panel 1000 includes a substrate 10, an opposite substrate 20, a display medium layer 30, and a plurality of pixel structures 40. The substrate 10 is opposite to the opposite substrate 20, and the display medium layer 30 is configured between the substrate 10 and the opposite substrate 20. The display medium layer 30 is made of a liquid crystal material, for instance. The pixel structures 40 are configured on the substrate 10 and located between the display medium layer 30 and the substrate 10. According to this embodiment, the pixel structures 40 can be selected from the pixel structure 100 or 200 described in the previous embodiments. Since the pixel structures 100 and 200 can be made by applying the simple manufacturing method and can have favorable display quality, the display panel 1000 having the pixel structures 100 or 200 can also be made by applying the simple manufacturing method and can have favorable display quality, for instance.

In light of the foregoing, the pixel structure described in the embodiments of the invention can be formed by applying a simple manufacturing method. Besides, the reflective pattern of the pixel structure can accomplish the diffusion reflection and can reflect light to the directions with different viewing angles according to the invention. Accordingly, the images displayed by the pixel structure in a reflective mode can have almost the same brightness at different viewing angles, and the quality of the images which are displayed in a reflective mode is favorable. On the other hand, since the display panel described in the embodiments of the invention has the aforesaid pixel structures, the display panel can have favorable display quality.

Although the invention has been described with reference to the embodiments thereof, it will be apparent to one of the ordinary skills in the art that modifications to the described embodiments may be made without departing from the spirit of the invention. Accordingly, the scope of the invention will be defined by the attached claims not by the above detailed description.

What is claimed is:

1. A pixel structure configured on a substrate, the substrate having at least one first display region and at least one second display region adjacent thereto, the pixel structure comprising:
   an active device configured on the substrate and located in the at least one first display region;
   a protection layer configured on the substrate and covering the active device, the protection layer being located in both the at least one first display region and the at least one second display region;
   a reflective pattern configured on the protection layer and located in the at least one first display region, the reflective pattern exposing a portion of the protection layer located in the at least one second display region and being doped with a fluorescence material; and
   a pixel electrode configured on the reflective pattern and the portion of the protection layer exposed by the reflective pattern.

2. The pixel structure as claimed in claim 1, wherein a material of the reflective pattern is a light curing material.

3. The pixel structure as claimed in claim 1, wherein a material of the reflective pattern includes metal oxide or metal salt.

4. The pixel structure as claimed in claim 1, wherein a material of the reflective pattern includes titanium oxide, magnesium oxide, magnesium sulfate, calcium oxide, or a combination thereof.

5. The pixel structure as claimed in claim 1, wherein an excited light emitted by the fluorescence material has a wavelength ranging from about 380 nm to about 470 nm.

6. The pixel structure as claimed in claim 1, wherein the reflective pattern has a substantially planar upper surface, and the pixel electrode is configured on the upper surface.

7. The pixel structure as claimed in claim 1, wherein the active device comprises:
   a gate configured on the substrate;
   a gate insulating layer configured on the substrate and covering the gate;
   a channel layer configured on the gate insulating layer and located above the gate; and
   a source and a drain, configured on the channel layer, the source and the drain being opposite to each other.

8. The pixel structure as claimed in claim 7, wherein the protection layer has a first opening, the first opening exposes the drain of the active device, and the pixel electrode is electrically connected to the drain through the first opening.

9. The pixel structure as claimed in claim 8, wherein the reflective pattern has a second opening corresponding to the first opening, the first opening and the second opening expose the drain of the active device, and the pixel electrode is electrically connected to the drain through the first opening and the second opening.

10. The pixel structure as claimed in claim 9, wherein the second opening partially exposes the protection layer located in the at least one first display region.

11. A display panel comprising:
   a plurality of the pixel structures as claimed in claim 1, the pixel structures being configured on the substrate;
   an opposite substrate opposite to the substrate; and
   a display medium layer configured between the substrate and the opposite substrate, each of the pixel structures being located between the substrate and the display medium layer.

12. The display panel as claimed in claim 11, wherein a material of the display medium layer is a liquid crystal material.

* * * * *